(12) United States Patent
Pak (10) Patent No.: US 10,721,171 B2
(45) Date of Patent: Jul. 21, 2020

(54) DATA TRANSFER SYSTEM AND CORRESPONDING METHODS

(71) Applicant: Concurrent Computer Corporation, Duluth, GA (US)

(72) Inventor: Dong W Pak, Hoschton, GA (US)

(73) Assignee: Vecima Networks Inc., British Columbia (CA)

( * ) Notice: Subject to any disclaimer, the term of this patent is extended or adjusted under 35 U.S.C. 154(b) by 953 days.

(21) Appl. No.: 13/925,358

(22) Filed: Jun. 24, 2013

(65) Prior Publication Data

US 2014/0380112 A1    Dec. 25, 2014

(51) Int. Cl.
*H04L 12/807* (2013.01)

(52) U.S. Cl.
CPC ................................ *H04L 47/27* (2013.01)

(58) Field of Classification Search
CPC ............................... H04L 47/27; H04L 65/00
USPC .................................................. 370/394, 474
See application file for complete search history.

(56) References Cited

U.S. PATENT DOCUMENTS

| | | | |
|---|---|---|---|
| 6,574,668 B1* | 6/2003 | Gubbi et al. .................. | 709/237 |
| 8,320,252 B2 | 11/2012 | Derom et al. | |
| 2005/0198028 A1* | 9/2005 | Padmanaban et al. ........... | 707/6 |
| 2007/0067804 A1* | 3/2007 | Six et al. ......................... | 725/58 |
| 2013/0028263 A1 | 1/2013 | Rajapakse | |
| 2013/0128735 A1* | 5/2013 | Li ........................... | H04L 47/25 370/230 |
| 2014/0157307 A1* | 6/2014 | Cox ................... | H04N 21/4331 725/34 |

* cited by examiner

*Primary Examiner* — Chi Tang P Cheng
(74) *Attorney, Agent, or Firm* — Philip H. Burrus, IV (57) ABSTRACT

A data transfer system (100) includes a data transmission device (103). The data transmission device can include a data communication circuit (206), a memory (202), and a control circuit (201) operable with the communication circuit and the memory circuit. The control circuit can transfer data (306) to a remote device, establish a sliding window (307) spanning a predetermined amount of data, and store the predetermined amount of data. In response to receiving an error message (311) identifying particular data (312) encountering errors in transfer, the control circuit can retransfer the particular data so long as the particular data is within the sliding window.

20 Claims, 6 Drawing Sheets

DATA TRANSFER SYSTEM AND CORRESPONDING METHODS

BACKGROUND

Technical Field

This disclosure relates generally to data systems, and more particularly to data transfer systems.

Background Art

Information processing and distribution is an increasingly important aspect of modern communication systems. The advent of multimedia content across networks has given rise to a need for reliably transferring data between devices. Communication techniques and systems have been developed to transfer data. Due to the serial nature with which users consume multimedia data, such as television programs and movies, it becomes important that all data be correctly transferred. Where, for example, there are errors in transmission, a user may "miss" selected portions of the content they are consuming. This is particularly problematic when consuming "live data feeds," such as a sporting event being transmitted in real time, or a political or news event being transmitted in real time. It would be advantageous to have an improved data transfer system and method.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to data transfer systems. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of data transfer as described herein. The non-processor circuits may include, but are not limited to, a communication circuit having one or more of a receiver, transmitter, or combinations thereof, signal drivers, clock circuits, power source circuits, and user input devices. As such, these functions may be interpreted as steps of a method to perform data transfer. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide systems and methods for data transmission error recovery that allow a data reception device to recover from data transmission errors successfully in the shortest time possible. Embodiments of the disclosure are well suited for use in live data feed transmissions, such as sporting events or other events in which data is being transmitted in real time rather than being stored for later transmission, in that they allow a data transmission device to retransmit select data when errors occur. At the same time, embodiments of the disclosure eliminate the need for the data transmission device to have a large memory device. This need is eliminated via the use of a sliding window that stores only a predetermined subset of data, such as about ten minutes worth of data.

In one embodiment, a method of transferring data includes a data transmission device initiating a transfer of data with a data communication circuit. When the data transfer is initiated, a control circuit of the data transmission device establishes a sliding window spanning a predetermined subset amount of data. In one embodiment, the predetermined subset amount is about ten minutes worth of data.

The data transmission device then buffers only the predetermined subset amount of the data, thereby eliminating the need for large, slow, expensive memory devices in the data transmission device. When data falls outside the sliding window, it is simply deleted from the memory circuit of the data transmission device in one embodiment.

A data reception device can transmit error messages to the data transmission device when particular data is not received. The error message will identify the particular data encountering errors in transmission. In response to receiving the error message, the data transmission device can determine if the particular data is within the sliding window. Where it is not, the data transmission device ignores the error message. Where the particular data is within the sliding window, the data transmission device can retransmit the particular data. In one embodiment, the data transmission device can repeat the retransmission for as long as the particular data is within the sliding window. In one embodiment, the data transmission device can continually repeat the retransmission of the particular data until the particular data is no longer within the sliding window.

Embodiments of the disclosure allow a data reception device failing to receive particular data to recover successfully. Moreover, embodiments of the disclosure allow the data reception device to recover in the shortest time possible. The sliding window, which is configured in the data transmission device only in one embodiment, can attempt to continually deliver the particular data that was unable to be delivered due to failures as long as the particular data is within the sliding window. When used in a multimedia system transmitting live data feeds, embodiments of the disclosure can be used to retransmit m3u8 files using WebDAVMKCOL methods in one embodiment.

Figure 1:
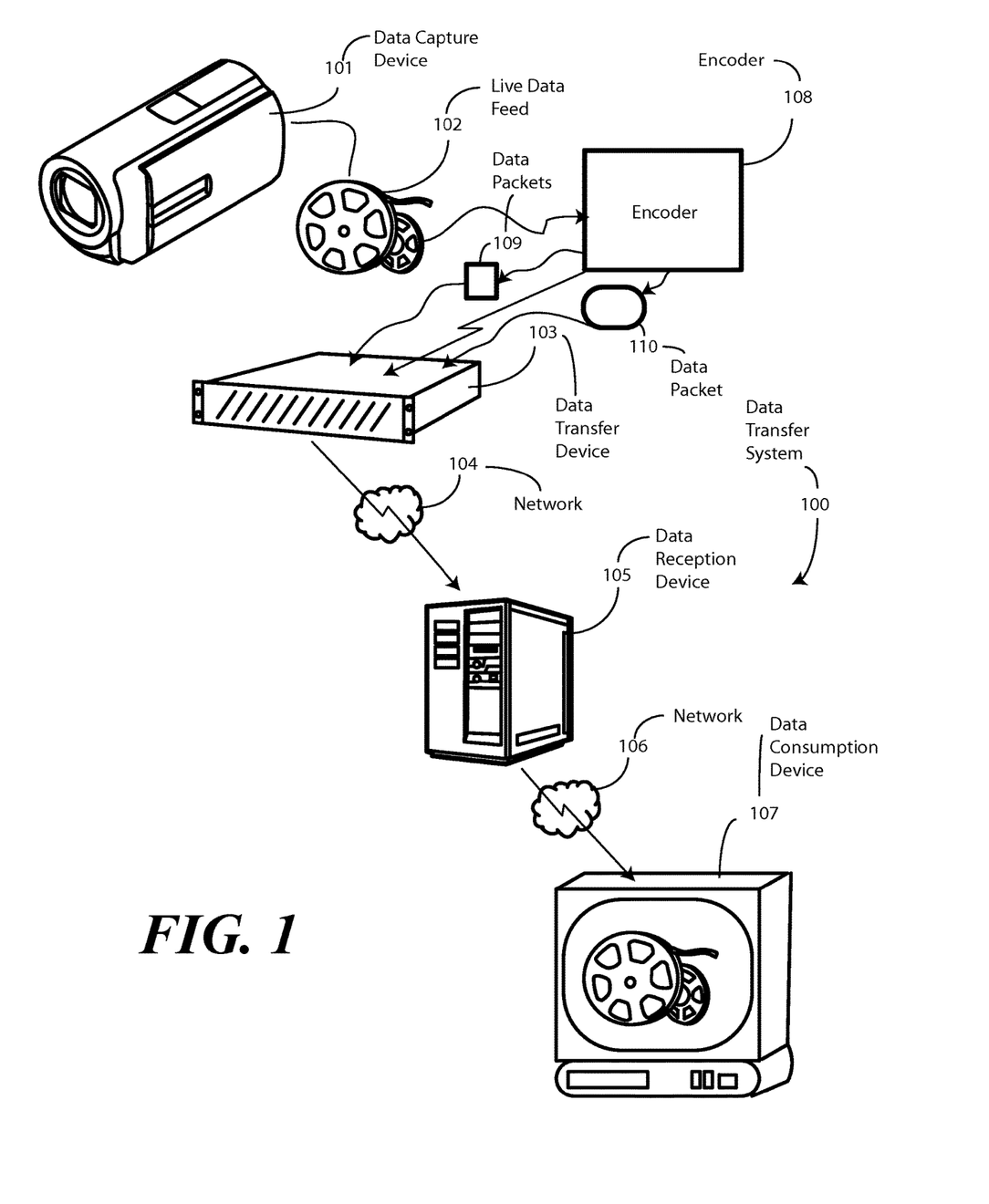
FIG. 1 illustrates one explanatory data transfer system in accordance with one or more embodiments.

Turning now to FIG. 1, illustrated therein is one data transmission system configured in accordance with one or more embodiments of the disclosure. A data capture device 101, shown here as a camera recording data, is in communication with an encoder 108. The encoder 108 receives live data from the data capture device 101, encodes it, and delivers it to a data transfer device 103. In one embodiment, the data capture device 101 and the encoder 108 are integrated together. For example, the data capture device 101 can comprise the encoder 108 in one embodiment. In another embodiment, the data capture device 101 is in communication with the encoder 108. For example, in one embodiment the encoder 108 can comprise a server in communication with the data capture device 101.

In one embodiment, the encoder 108 captures a live data feed 102. As used herein, a "live data feed" refers to data that is transmitted from the data capture device 101 as it is captured by the data capture device 101. Said differently, the live data feed 102 is real time data that is captured and sent while it is being captured. By contrast, a non-live data feed would be one that is captured in its entirety, stored, and transmitted at a later time. Examples of live data feeds 102 include sporting events, political events, and news events that are broadcast in real time. While a live data feed 102 will be used as one example of data that can be transferred with embodiments of the disclosure for illustration, it will be obvious to those of ordinary skill in the art having the benefit of this disclosure that other types of data can be transferred as well.

In one embodiment, the encoder 108 transmits data packets 109 to a data transmission device 103. The data transmission device 103 serves as a "middle man" between the encoder 108 and a data reception device 105. In one embodiment, the encoder 108 uses a sliding window to send the data packets 109. For example, the sliding window can include about ten minutes of data. Once the data has been sent, the encoder sends a delete data packet 110 to the data transmission device 103 when the sliding window ends. The delete data packet 110 requests that previously sent data packets 109, which are now outside the sliding window of the encoder 108, be deleted in the data transmission device 103. The purpose of the delete data packet 110 is to allow the data transmission device 103 to reduce its memory size, thereby reducing its cost and complexity of operation.

The data transfer device 103 is then in communication across a network 104 with the data reception device 105. The data reception device 105 is in communication across a network 106, which may be the same as network 104 or different, with a data consumption device 107, shown here as a television. The data reception device 105 serves as a "middle man" between the data transmission device 103 and the data consumption device 107. The data reception device 105 can perform processing tasks, such as formatting or other processing to convert the live data feed 102 into a format suitable for consumption in the data consumption device 107. In one embodiment, the data consumption device 107 is configured to pull data from the data reception device 105.

Figure 2:
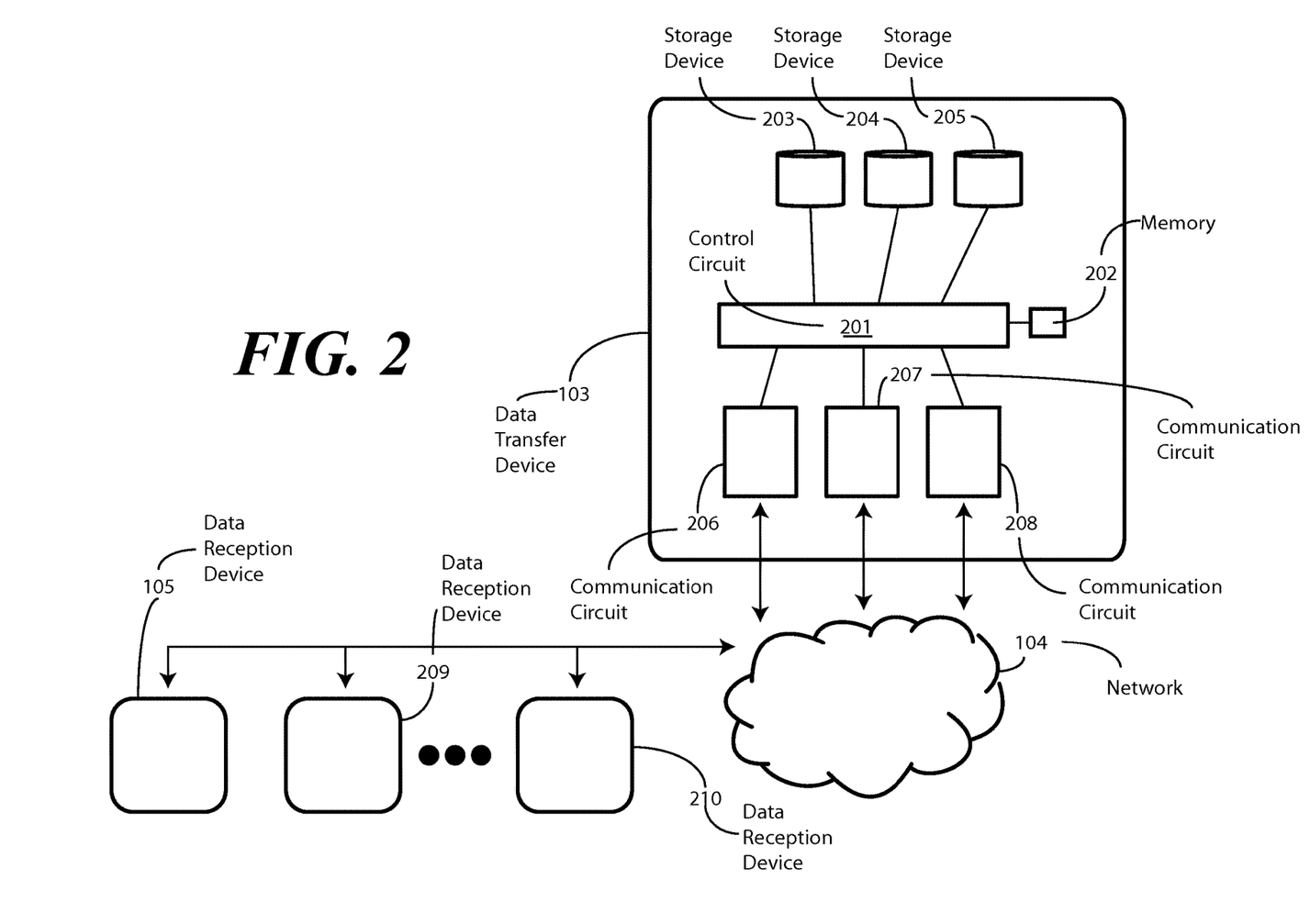
FIG. 2 illustrates an explanatory data transfer device in accordance with one or more embodiments.

Turning to FIG. 2, illustrated therein is a schematic block diagram of a data transfer device 103. In one embodiment, the data transfer device 103 includes a control circuit 201 or other processing device. The control circuit 201 can also be operable with one or more memories 202 or storage devices 203,204,205. In one embodiment, these memories 202 or storage devices 203,204,205 can comprise a computer readable medium suitable for storing data and/or executable instructions or code that the control circuit can execute to perform one or more methods in accordance with one or more embodiments. One or more data communication circuits 206,207,208, configured here as multimedia data streaming engines, are in communication with remote data reception devices 105,209,210 across the network 104.

Figure 3:
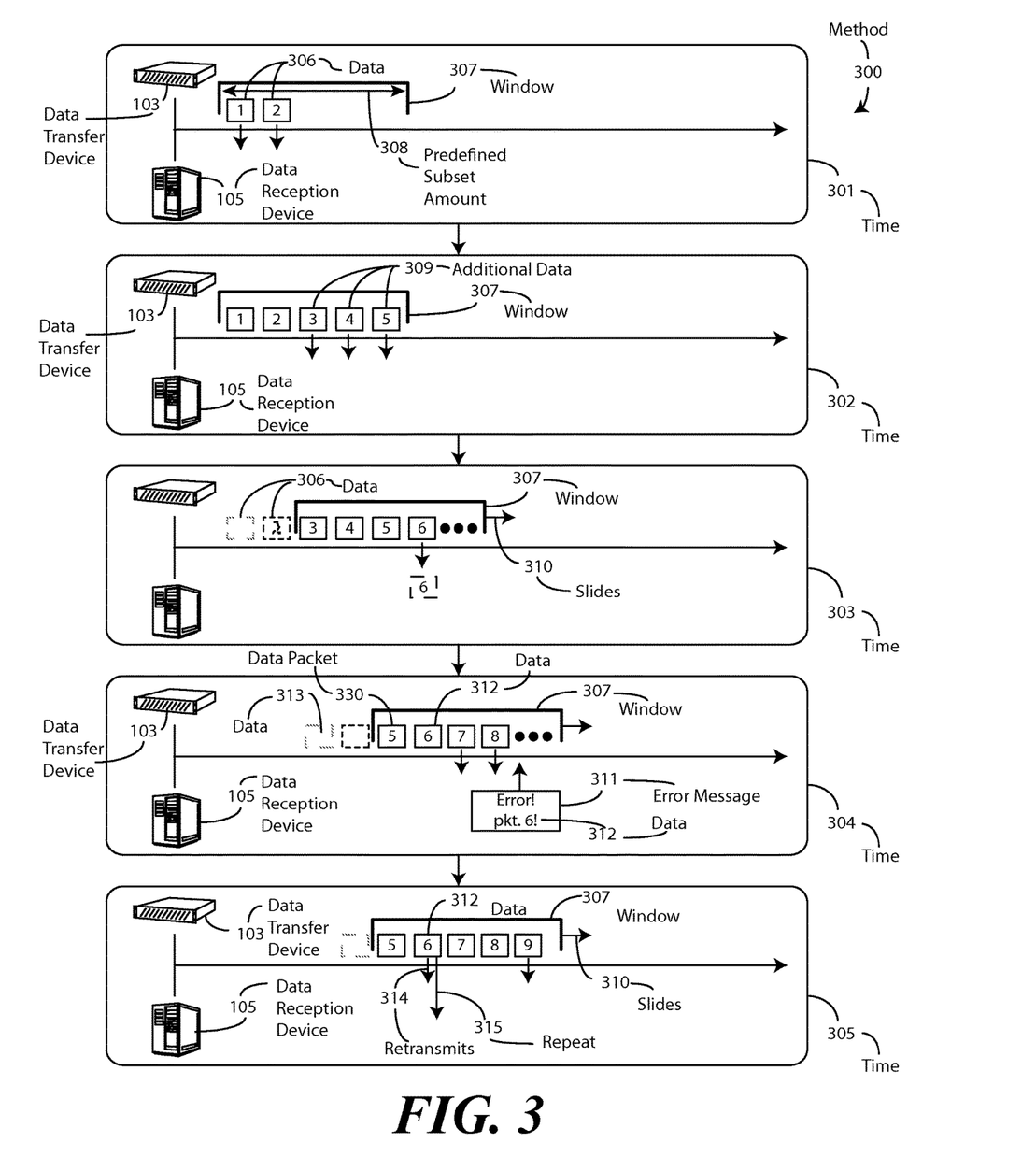
FIG. 3 illustrates one explanatory data transfer method in accordance with one or more embodiments.

Turning now to FIG. 3, illustrated therein is one embodiment of a method 300 for transferring data in accordance with one or more embodiments. The method 300 of FIG. 3 is suitable for configuration as executable code operable with control circuits in one or more of the data transmission device 103 or the data reception device 105. In FIG. 3, items presented above the horizontal line terminating in the arrow in the right side originate in the data transmission device 103, while items presented below the horizontal line originate in the data reception device 105.

At time 301, the data transmission device 103 initiates the transfer of data 306 from a data communication circuit (206) to the data reception device 105. In one embodiment, this transfer occurs across a network (104).

At time 301, the data transmission device 103 also establishes, with its control circuit (201), a sliding window 307 spanning a predetermined subset amount 308 of data. The predetermined subset amount 308 of data can vary based upon application. In one embodiment, the predetermined subset amount 308 of data is about ten minutes worth of data. This amount works well in practice where the data comprises live data feed (102). Other predetermined subset amounts 308 of data suiting other applications will be obvious to those of ordinary skill in the art having the benefit of this disclosure.

In one embodiment, the data transmission device 103 infers what the predetermined subset amount 308 of data should be from the data packets (109) and delete data packets (110) sent from the encoder (108). For example, in one embodiment the data transmission device 103 is configured to determine how long the sliding window of the encoder (108) is, and to emulate the same for synchronization ease, from the data packets (109) and the delete data packets (110). If, for example, the first delete data packet (110) is received ten minutes after the first data packet (109), the data transmission device 103 can infer that the sliding window in the encoder (108) is a ten minute sliding window. Accordingly, the data transmission device 103 can set its sliding window 307 such that the predetermined subset amount of data 308 is about ten minutes so as to match the sliding window of the encoder (108).

At time 302, the data transmission device 103 continues to transfer additional data 309 to the data reception device 105. While data is within the sliding window 307, the data is buffered and stored in one or more memories (202) or storage devices (203,204,205). As shown at time 303, when data 306 is outside the sliding window 307, it is deleted from the one or more memories (202) or storage devices (203, 204,205). As also shown at time 303, the sliding window 307 slides 310 temporally during the transfer of data.

At time 304, in one embodiment the data transmission device 103 can determine that data packet 330 was delivered successfully to the data reception device 105. In one or more embodiments, the data transmission device 103 can delete this data packet 330 since it has been successfully received and there is no longer a need to store it in the one or more memories (202) or storage devices (203,204,205). Note that this deletion can occur despite the fact that data packet 330 is still within the sliding window 307.

As shown at time 304, the data transmission device 103 can receive, with its data communication circuit (206) at least one error message 311 in response to initiating the transmission of data. In one embodiment, the at least one error message 311 identifies particular data 312 encountering errors in transmission. In this example, data 312, which is identified as "frame 6" was not received at the data reception device 105. Accordingly, the data reception device 105 is to transmit the error message 311 to the data transmission device 103 when the particular data 312 encounters the errors in transfer.

At time 304, the data transmission device 103 determines whether the particular data 312 is within the sliding window 307. In this case, the particular data 312 is still within the sliding window 307. Accordingly, the data transmission device 103 has the particular data 312 buffered in the one or more memories (202) or storage devices (203,204,205). By contrast, had the error message 311 identified particular data 313, that particular data 313 would have been deleted from the one or more memories (202) or storage devices (203, 204,205) due to it being outside the sliding window 307. In such a case, the data transmission device 103 may be configured to simply ignore the error message 311.

However, since the particular data 312 identified in the error message 311 is within the sliding window 307, in one embodiment the data transmission device 103 retransmits 314 the particular data 312 as shown at time 305.

In embodiment, the data transmission device 103 is configured to repeat 315 the retransmission of the particular data 312. For example, in one embodiment the data transmission device 103 can be configured to continue to repeat 315 the retransmission of the particular data for as long as the particular data 312 is within the sliding window 307. In one embodiment, the data transmission device 103 is configured to continually repeat 315 the retransmission of the particular data 312 for as long as the particular data 312 is within the sliding window 307. When the particular data 312 is no longer within the sliding window 307, i.e., when the particular data 312 falls outside the sliding window 307 due to the sliding 310 of the sliding window 307, the data transmission device 103 is to terminate the retransmission of the particular data 312. Advantageously, the retransmission allows the data reception device 105 to recover from errors in transmission, even where the particular data 312 is within a live data feed (102).

In one or more embodiments, the sliding window 307 is defined, and exists, only in the data transmission device 103. In one or more embodiments, the data reception device 105 comprises no indication that the sliding window 307 even exists. The data reception device 105 can be configured to send error messages 311. However, it will only receive retransmissions of particular data when that data falls within the sliding window 307. Where the data is not within the sliding window 307, it will not be retransmitted. However, the data reception device 105 will not have information regarding why the retransmission did not occur.

Figure 4:
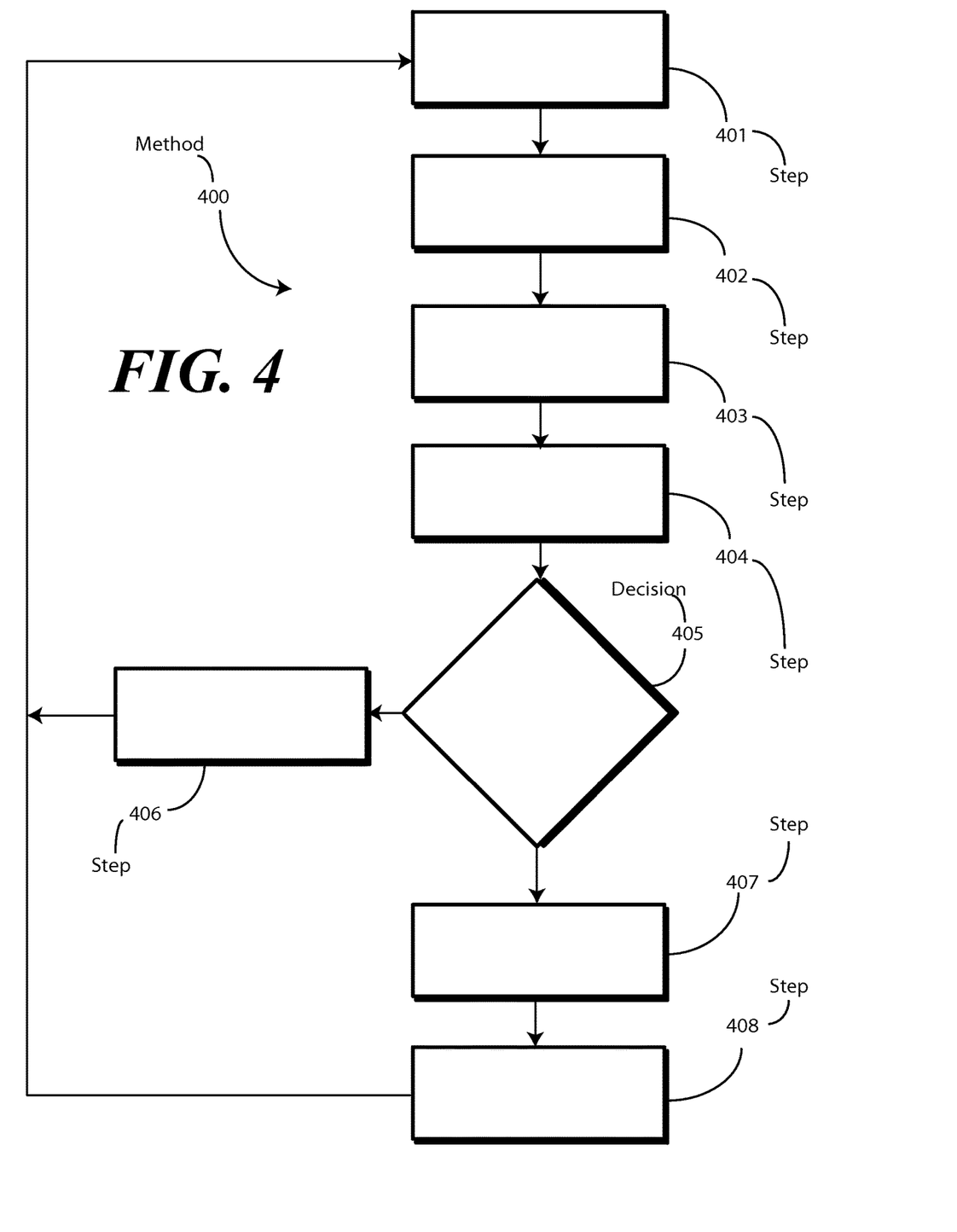
FIG. 4 illustrates one explanatory data transfer method in accordance with one or more embodiments.

Turning now to FIG. 4, illustrated therein is another method 400 for data transfer in accordance with one or more embodiments of the disclosure. At step 401, a control circuit of a data transmission device is to transfer data to a remote device, which may be a data reception device in one embodiment, with a communication circuit. At step 402, the control circuit of the data transmission device is to establish a sliding window spanning a predetermined amount of data. At step 403, the control circuit is to store the data spanned by the sliding window, which would be the predetermined amount of data in one embodiment, in a memory or storage device. At step 403 the control circuit can optionally delete data outside the sliding window.

At step 404, the control circuit of the data transmission device receives an error message identifying particular data encountering errors while in transfer. In one embodiment, the error message is sent from the remote device.

At decision 405, the control circuit determines whether the particular data identified in the error message is within the sliding window. In one embodiment the control circuit is to ignore the error message where the particular data is outside the sliding window at optional step 406.

Where the particular data identified in the error message is within the sliding window, the control circuit is to retransfer the particular data at step 407. In one embodiment, the control circuit is to retransfer the particular data so long as the particular data is within the sliding window at step 407. In one embodiment, the control circuit is to repeat the retransfer as long as the particular data is within the sliding window at step 408. In one embodiment, the control circuit is to continually repeat the retransfer as long as the particular data is within the sliding window at step 408.

Figure 5:
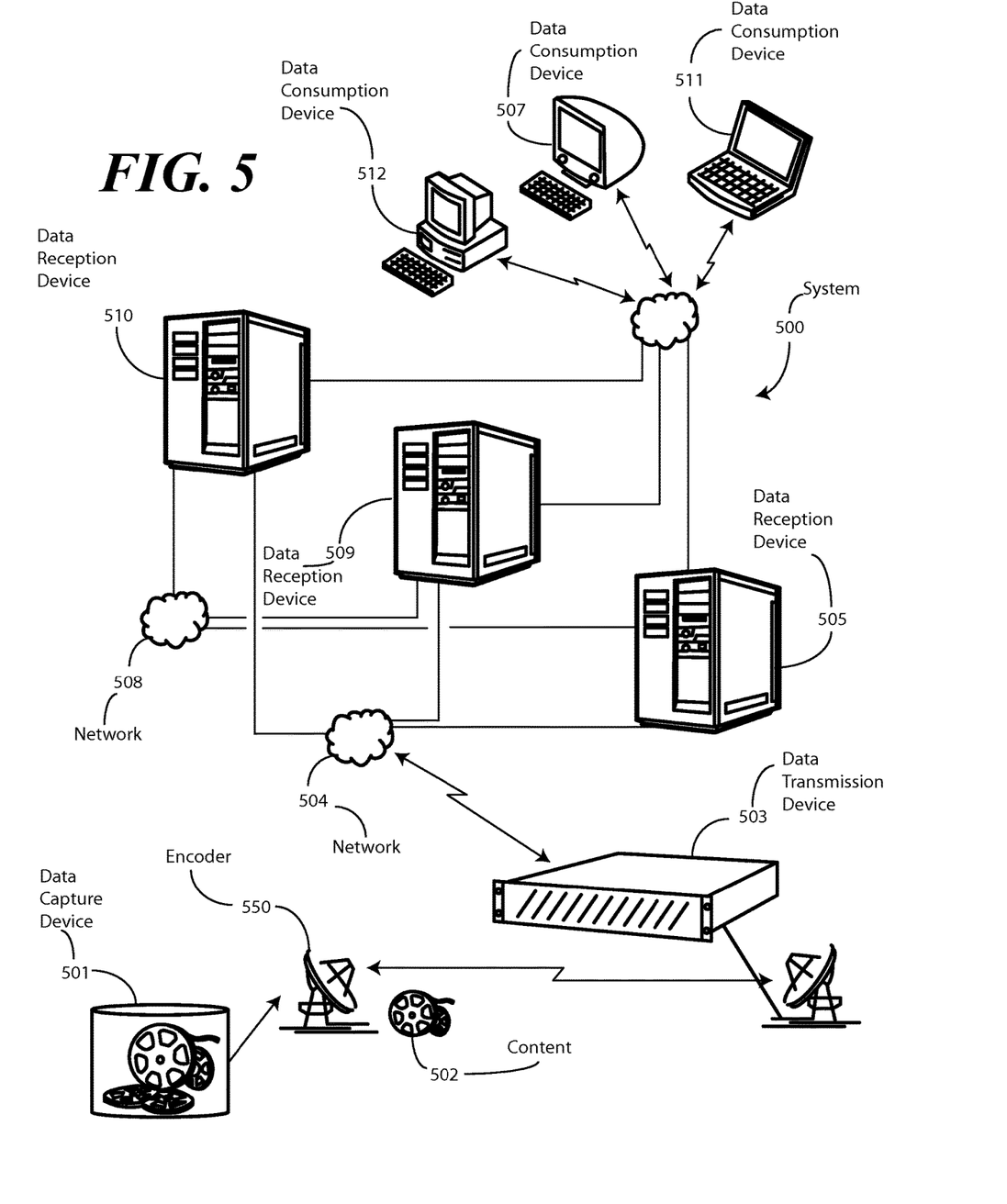
FIG. 5 illustrates one explanatory data transfer system in accordance with one or more embodiments.

Turning now to FIG. 5, illustrated therein is another data transfer system 500 in accordance with one or more embodiments of the disclosure. An encoder 550 is in communication with a data transmission device 503. The data transmission device 503 is in communication with a data capture device 501. In one embodiment, the data transmission device 503 is in communication with encoder 550 to capture data in real time.

The data transmission device 503 is in communication across one or more networks 504,508 with a cluster of data reception devices 505,509,510. The data reception devices 505,509,510 are in communication with one or more data consumption devices 507,511,512. In one or more embodiments, the data transmission device 503 is to deliver content 502 to all of the data reception devices 505,509,510. In one embodiment, the content 502 is replicated on each of the data reception devices 505,509,510.

In one or more embodiments, the data transmission device 503 is to transfer data for the content 502 to the data reception devices 507,511,512. The data transmission device 503 is further to establish a sliding window spanning a predetermined amount of data and to store the predetermined amount of data falling within the sliding window in a buffer or other memory or storage device.

When data fails to make it to one of the data reception devices 507,511,512 the data reception device failing to receive the data can transmit an error message 513 to the data transmission device 503. In response to receiving the error message 513, which in one embodiment identifies particular data encountering errors in transfer, the data transmission device 503 is to retransfer the particular data so long as the particular data is within the sliding window.

In the data transmission system, the content 502 is ingested to the data reception devices 507,511,512 through the data transmission device 503. The data transmission device 503 pushes a predetermined amount of data falling within a sliding window, which is about ten minutes worth of data in one embodiment, to each of the data reception devices 507,511,512. In one embodiment, the data transmission device 503 pushes about ten minutes worth of live content at about every ten minutes per channel. The live content is then replicated on each of the data reception devices 507,511,512.

Figure 6:
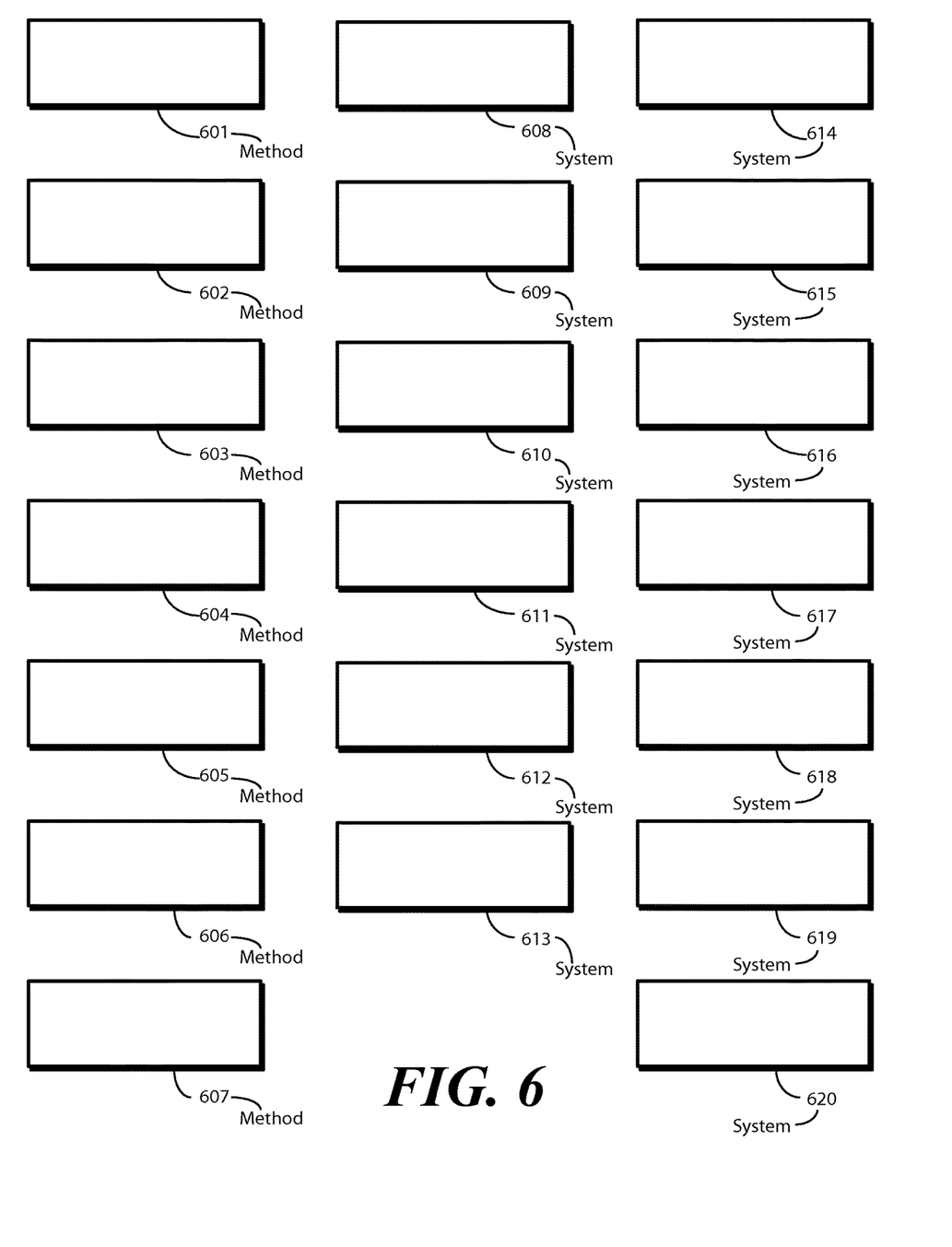
FIG. 6 illustrates various embodiments of the disclosure.

Turning to FIG. 6, illustrated therein are various embodiments of the disclosure. At 601, a method of transferring data comprises initiating transfer of the data from a data communication circuit. At 601, the method comprises establishing, with a control circuit, a sliding window spanning a predetermined subset amount of data. At 601, the method includes buffering data, in a memory circuit, the predetermined subset amount of data. At 601, the method includes deleting, from the memory circuit, data outside the sliding window. At 601, the method includes receiving, with the data communication circuit, at least one error message in response to the initiating, the at least one error message identifying particular data encountering errors in transmission. At 601, the method includes determining, with the control circuit, whether the particular data is within the sliding window. At 601, the method includes, where the particular data is within the sliding window, retransmitting, with the data communication circuit, the particular data.

At 602, the method of 601 further comprises repeating the retransmitting the particular data. At 603, the method of 602 includes the repeating continuing as long as the particular data is within the sliding window. At 604, the method of 603 further comprises terminating the continuing when the particular data falls outside the sliding window.

At 605, the method of 601 further comprises sliding the sliding window during the transfer of the data. At 606, the predetermined subset amount of data at 601 comprises about ten minutes of data. At 607, the data of 606 comprises a live data feed.

At 608, a data transfer system comprises a device, comprising a communication circuit, a memory circuit, and a control circuit operable with the communication circuit and the memory circuit. At 608, the control circuit is to transfer data to a remote device in communication with the communication circuit. At 608, the control circuit is to establish a sliding window spanning a predetermined amount of data. At 608, the control circuit is to store the predetermined amount of data. At 608, in response to receiving an error message identifying particular data encountering errors in transfer, the control circuit is to retransfer the particular data so long as the particular data is within the sliding window.

At 609, the control circuit of 608 is to repeat the retransfer as long as the particular data is within the sliding window. At 610, the control circuit of 608 is to delete data outside the sliding window. At 611, the control circuit of 608 is to determine whether the particular data is within the sliding window. At 612, the control circuit of 608 is to ignore the error message where the particular data is outside the sliding window.

At 613, the data of 608 comprises a live data feed. At 614 the device of 608 comprises a server. AT 615, the device of 608 comprises a data capture device.

At 616, a data transfer system comprises a data transmission device and one or more data reception devices. At 616, the data transmission device is to transfer data to the data reception device. At 616, the data transmission device is to establish a sliding window spanning a predetermined amount of data. At 616, the data transmission device is to store the predetermined amount of data in a buffer. At 616, the data transmission device is to, in response to receiving an error message identifying particular data encountering errors in transfer, retransfer the particular data. At 616, the data transmission device is to retransfer the particular data so long as the particular data is within the sliding window.

At 617, the data reception device of 616 is to transmit the error message when the particular data encounters the errors in transfer. At 618, the data transmission device of 616 is in communication with a data capture device to capture data in real time. At 619, the data capture device of 618 comprises a camera. At 620, the sliding window of 618 resides only in the data transmission device. At 620 the data reception device is unaware that the sliding window of 618 exists.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of transferring data, comprising:
   initiating transfer of the data from a data communication circuit;
   establishing, with a control circuit at the data communication circuit only, a sliding window defined as a function of time, existing only at the data communication circuit, and spanning a predetermined subset amount of data;
buffering, in a memory circuit, the predetermined subset amount of data;
deleting, from the memory circuit, data outside the sliding window;
receiving, with the data communication circuit, at least one error message in response to the initiating, the at least one error message identifying particular data encountering errors in transmission;
determining, with the control circuit, whether the particular data is within the sliding window; and
where the particular data is within the sliding window, retransmitting, with the data communication circuit, the particular data.

2. The method of claim 1, further comprising repeating the retransmitting the particular data.

3. The method of claim 2, the repeating continuing as long as the particular data is within the sliding window.

4. The method of claim 3, further comprising terminating the continuing when the particular data falls outside the sliding window.

5. The method of claim 1, further comprising sliding the sliding window during the transfer of the data.

6. The method of claim 1, the predetermined subset amount of data comprising about ten minutes of data.

7. The method of claim 1, the establishing comprising receiving an initial delete data packet after an initial data packet.

8. A data transfer system, comprising:
a data transmission device, comprising:
  a communication circuit;
  a memory circuit; and
  a control circuit operable with the communication circuit and the memory circuit to:
    transfer data to a remote device in communication with the communication circuit, the data comprising a live data feed;
    establish, only at the data transmission device, a sliding window defined as a function of time, existing only at the data transmission device, and spanning a predetermined amount of data;
    store the predetermined amount of data; and
    in response to receiving an error message identifying particular data encountering errors in transfer, retransfer the particular data so long as the particular data is within the sliding window.

9. The data transfer system of claim 8, the control circuit to repeat the retransfer as long as the particular data is within the sliding window.

10. The data transfer system of claim 8, the control circuit to delete data outside the sliding window.

11. The data transfer system of claim 8, the control circuit to determine whether the particular data is within the sliding window.

12. The data transfer system of claim 8, the control circuit to ignore the error message where the particular data is outside the sliding window.

13. The data transfer system of claim 8, the live data feed comprising a sporting event.

14. The data transfer system of claim 8, the device comprising a server.

15. The data transfer system of claim 8, the device comprising a data capture device, the live data feed transmitted from the data capture device as it is captured by the data capture device.

16. A data transfer system, comprising:
a data transmission device; and
a data reception device;
the data transmission device to:
  transfer data to the data reception device;
  establish, only at the data transmission device, a sliding window defined as a function of time, existing only at the transmission device, and spanning a predetermined amount of data;
  store the predetermined amount of data in a buffer; and
  in response to receiving an error message identifying particular data encountering errors in transfer;
  retransfer the particular data so long as the particular data is within the sliding window.

17. The data transfer system of claim 16, the data reception device to transmit the error message when the particular data encounters the errors in transfer.

18. The data transfer system of claim 16, the data transmission device in communication with an encoder device to capture data in real time.

19. The data transfer system of claim 18, the encoder in communication with a data capture device.

20. The data transfer system of claim 18, the data transmission device to derive the sliding window from received data.

* * * * *